(12) United States Patent
Iwazaki et al.

(10) Patent No.: US 8,024,105 B2
(45) Date of Patent: Sep. 20, 2011

(54) APPARATUS AND METHOD FOR DETECTING ABNORMAL AIR-FUEL RATIO VARIATION AMONG CYLINDERS OF MULTI-CYLINDER INTERNAL COMBUSTION ENGINE

(75) Inventors: Yasushi Iwazaki, Ebina (JP); Toru Kidokoro, Hadano (JP); Hiroshi Sawada, Gotenba (JP); Keiji Imamura, Susono (JP); Fumihiko Nakamura, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 279 days.

(21) Appl. No.: 12/416,262

(22) Filed: Apr. 1, 2009

(65) Prior Publication Data
US 2009/0260347 A1 Oct. 22, 2009

(30) Foreign Application Priority Data
Apr. 17, 2008 (JP) ................................ 2008-108192

(51) Int. Cl.
*F02D 41/22* (2006.01)
(52) U.S. Cl. ........ 701/107; 701/103; 123/479; 123/690; 123/676; 73/114.02; 73/114.06
(58) Field of Classification Search .................. 123/479, 123/676, 690; 701/103, 107; 73/114.02, 73/114.06
See application file for complete search history.

(56) References Cited

U.S. PATENT DOCUMENTS

| 7,591,258 B2 * | 9/2009 | Nagel et al. ................... 123/676 |
| 7,650,223 B2 * | 1/2010 | Shiraishi et al. .............. 701/103 |
| 2005/0039722 A1 * | 2/2005 | Montgomery et al. ....... 123/435 |
| 2005/0102076 A1 * | 5/2005 | Kariya et al. ................... 701/34 |
| 2007/0289584 A1 * | 12/2007 | Nagel et al. ................... 123/676 |
| 2009/0076709 A1 * | 3/2009 | Shiraishi et al. .............. 701/103 |
| 2009/0125212 A1 * | 5/2009 | Kurashima et al. ........... 701/103 |
| 2010/0147262 A1 * | 6/2010 | Martin et al. ................. 123/299 |

FOREIGN PATENT DOCUMENTS

| JP | 2002-266682 | 9/2002 |
| JP | 2004-176689 | 6/2004 |

* cited by examiner

*Primary Examiner* — Erick Solis
(74) *Attorney, Agent, or Firm* — Oblon, Spivak, McClelland, Maier & Neustadt, L.L.P.

(57) ABSTRACT

An apparatus and a method for detecting abnormal air-fuel ratio variation among cylinders of a multi-cylinder internal combustion engine are provided. The apparatus includes: a catalyst that is provided in an exhaust passage of the multi-cylinder internal combustion engine; a catalyst temperature detection unit that detects a temperature of the catalyst; a catalyst temperature estimation unit that estimates a temperature of the catalyst based on an engine operating state; and an abnormality detection unit that determines whether abnormal air-fuel ratio variation among the cylinders has occurred based on the detected temperature of the catalyst and the estimated temperature of the catalyst.

14 Claims, 7 Drawing Sheets

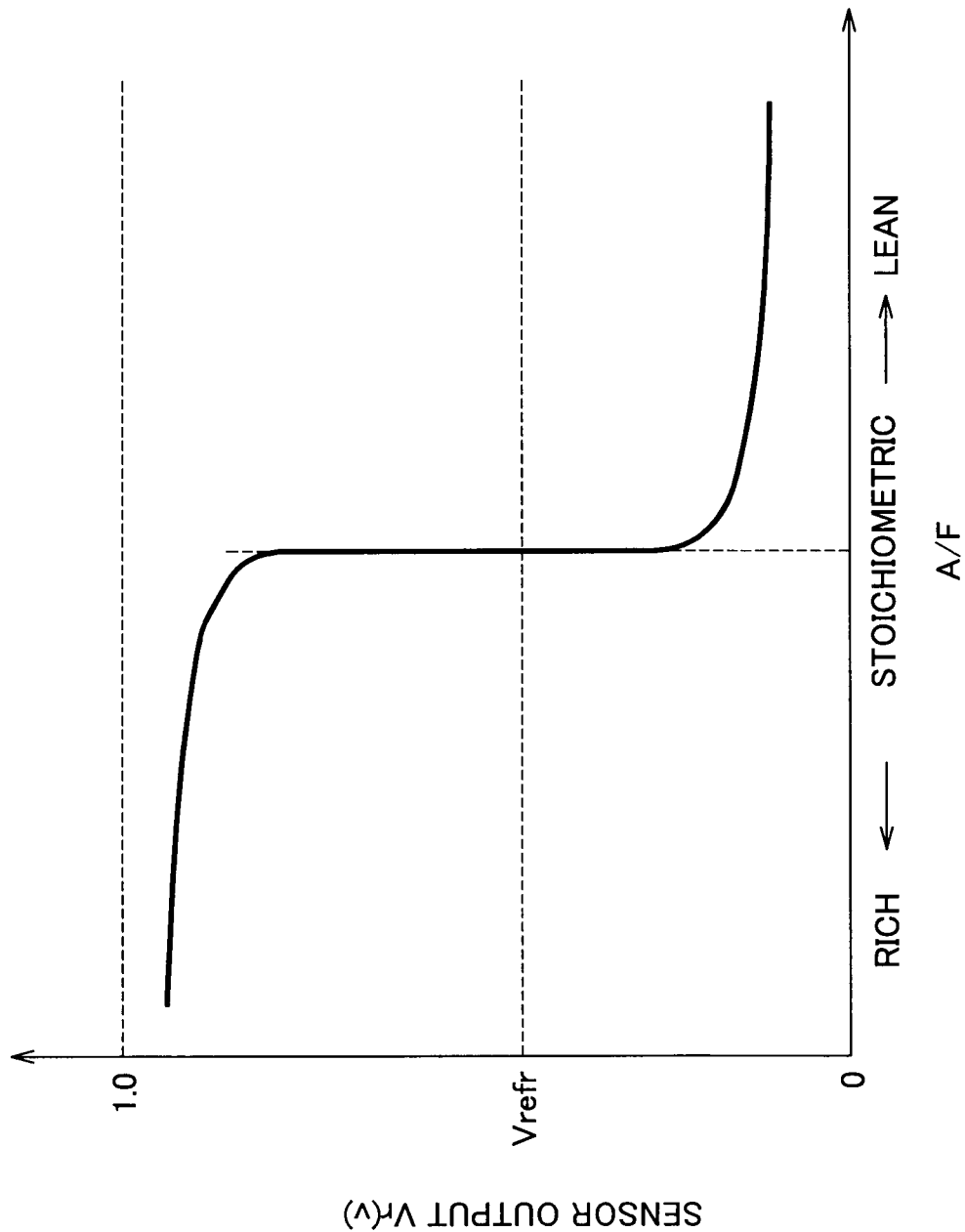

APPARATUS AND METHOD FOR DETECTING ABNORMAL AIR-FUEL RATIO VARIATION AMONG CYLINDERS OF MULTI-CYLINDER INTERNAL COMBUSTION ENGINE

INCORPORATION BY REFERENCE

The disclosure of Japanese Patent Application No. 2008-108192 filed on Apr. 17, 2008 including the specification, drawings and abstract is incorporated herein by reference in its entirety.

BACKGROUND OF THE INVENTION

1. Field of the Invention

The invention relates generally to an apparatus and method for detecting abnormal air-fuel ratio variation among cylinders of a multi-cylinder internal combustion engine. More specifically, the invention relates to an apparatus and method for detecting relatively great air-fuel ratio variation among cylinders of a multi-cylinder internal combustion engine.

2. Description of the Related Art

In an internal combustion engine provided with an exhaust gas control system that uses a catalyst, it is usually necessary to control a mixture ratio between air and fuel, which constitute an air-fuel mixture that is burned in the internal combustion engine, that is, an air-fuel ratio, in order to remove toxic substances in the exhaust gas using the catalyst with high efficiency. To control the air-fuel ratio, an air-fuel ratio sensor is provided in an exhaust passage of the internal combustion engine, and feedback control is executed in such a manner that the air-fuel ratio that is detected by the air-fuel ratio sensor agrees with a predetermined target air-fuel ratio.

In a multi-cylinder internal combustion engine, air-fuel ratio control is usually executed using the same control amount for all the cylinders. Therefore, even if the air-fuel ratio control is executed, the actual air-fuel ratio may vary among the cylinders. If the variation range is narrow, such small air-fuel ratio variation is absorbed by executing the air-fuel ratio feedback control, and toxic substances in the exhaust gas are removed by the catalyst. Therefore, such small air-fuel ratio variation does not exert an influence on the exhaust emission, and, therefore, does not cause a problem. However, if the air-fuel ratio greatly varies among the cylinders due to, for example, a malfunction of a fuel injection system of part of the cylinders, the exhaust emission deteriorates, which may cause a problem. Preferably, such great air-fuel ratio variation that may cause deterioration of the exhaust emission should be detected as an abnormality. Especially, in the case of an internal combustion engine for an automobile, detecting abnormal air-fuel ratio variation among cylinders using an on-board device is required in order to prevent a vehicle that emits deteriorated exhaust emission from running. Recently, there are moves for legislating provision of an on-board device that detects abnormal air-fuel ratio variation among the cylinders.

For example, a device described in Japanese Patent Application Publication No. 2004-176689 (JP-A-2004-176689) obtains a value indicating operating state variation among cylinders of an internal combustion engine based on, for example, an intake pipe pressure detected by an intake pipe pressure sensor.

It is newly revealed that there is a correlation between a range of air-fuel ratio variation among cylinders and a catalyst temperature.

SUMMARY OF THE INVENTION

The invention provides an apparatus and method for appropriately detecting abnormal air-fuel ratio variation among cylinders of a multi-cylinder internal combustion engine based on a correlation between a range of air-fuel ratio variation among the cylinders and a catalyst temperature.

A first aspect of the invention relates to an apparatus that detects abnormal air-fuel ratio variation among cylinders of a multi-cylinder internal combustion engine. The apparatus includes: a catalyst that is provided in an exhaust passage of the multi-cylinder internal combustion engine; a catalyst temperature detection unit that detects a temperature of the catalyst; a catalyst temperature estimation unit that estimates a temperature of the catalyst based on an engine operating state; and an abnormality detection unit that determines whether abnormal air-fuel ratio variation among the cylinders has occurred based on the detected temperature of the catalyst and the estimated temperature of the catalyst.

A second aspect of the invention relates to a method for detecting abnormal air-fuel ratio variation among cylinders of a multi-cylinder internal combustion engine that includes a catalyst that is provided in an exhaust passage of the multi-cylinder internal combustion engine and a catalyst temperature detection unit that detects a temperature of the catalyst. According to the method, a temperature of the catalyst is estimated based on an engine operating state, and whether abnormal air-fuel ratio variation among the cylinders has occurred is determined based on the detected temperature of the catalyst and the estimated temperature of the catalyst.

It is newly revealed that an air-fuel ratio fluctuates within one engine cycle (720° C.A) if air-fuel ratio variation among the cylinders occurs, and, as a result, the catalyst temperature becomes higher than that when there is no air-fuel ratio variation among the cylinders. As the range of air-fuel ratio variation becomes wider, the catalyst temperature increases by a larger amount. Therefore, according to the aspects of the invention, the actual catalyst temperature is detected, while the catalyst temperature is estimated based on the engine operating state. The estimated catalyst temperature is a value independent of the range of air-fuel ratio variation among the cylinders, whereas the detected catalyst temperature reflects the range of air-fuel ratio variation among the cylinders. If air-fuel ratio variation among the cylinders occurs, the detected catalyst temperature deviates from the estimated catalyst temperature by a large amount. Therefore, using this feature, whether abnormal air-fuel ratio variation among the cylinder has occurred is determined based on the detected catalyst temperature and the estimated catalyst temperature.

In the aspects of the invention described above, whether abnormal air-fuel ratio variation among the cylinders has occurred may be determined based on the deviation of the detected temperature of the catalyst from the estimated temperature of the catalyst.

If abnormal air-fuel ratio variation among the cylinders occurs, the deviation of the detected catalyst temperature from the estimated catalyst temperature increases. Therefore, whether abnormal air-fuel ratio variation among the cylinders has occurred is determined using this feature.

In the aspects of the invention described above, whether abnormal air-fuel ratio variation among the cylinders has occurred may be determined based on the deviation of an accumulated value obtained by accumulating the detected temperatures of the catalyst for a predetermined time from an accumulated value obtained by accumulating the estimated temperatures of the catalyst for the predetermined time.

In the aspects of the invention described above, whether abnormal air-fuel ratio variation among the cylinders has occurred may be determined based on an accumulated value that is obtained by accumulating the deviations of the detected temperatures of the catalyst from the estimated temperatures of the catalyst for a predetermined time.

If abnormal air-fuel ratio variation among the cylinders occurs, the deviation of the accumulated value obtained by accumulating the detected temperatures of the catalyst from the accumulated value obtained by accumulating the estimated temperatures of the catalyst increases, or the accumulated value that is obtained by accumulating the deviations of the detected temperatures of the catalyst from the estimated temperatures of the catalyst increases. Therefore, whether abnormal air-fuel ratio variation among the cylinders has occurred is determined using this feature.

In the aspects of the invention described above, an intake air amount detection unit that detects an amount of air taken in the internal combustion engine may be provided, and the temperature of the catalyst may be estimated based on at least the detected amount of air taken in the internal combustion engine.

In the aspects of the invention described above, a temperature of the catalyst may be estimated based on an amount of change in the temperature of the catalyst caused by heat transferred from exhaust gas discharged from the internal combustion engine, an amount of change in the temperature of the catalyst caused by reaction heat within the catalyst, and an amount of change in the temperature of the catalyst caused by heat radiated from the catalyst.

According to the aspects of the invention described above, it is possible to appropriately detect abnormal air-fuel ratio variation among cylinders of a multi-cylinder internal combustion engine based on a correlation between a range of air-fuel ratio variation among the cylinders and a catalyst temperature.

BRIEF DESCRIPTION OF THE DRAWINGS

The features, advantages and technical and industrial significance of this invention will be described in the following detailed description of an example embodiment with reference to the accompanying drawings, wherein the same or corresponding portions will be denoted by the same reference numerals and wherein:

FIG. 3 is a graph indicating output characteristics of a catalyst downstream-side sensor according to the embodiment of the invention;

DETAILED DESCRIPTION OF THE EMBODIMENT

Hereafter, an example embodiment of the invention will be described with reference to the accompanying drawings.

Figure 1:
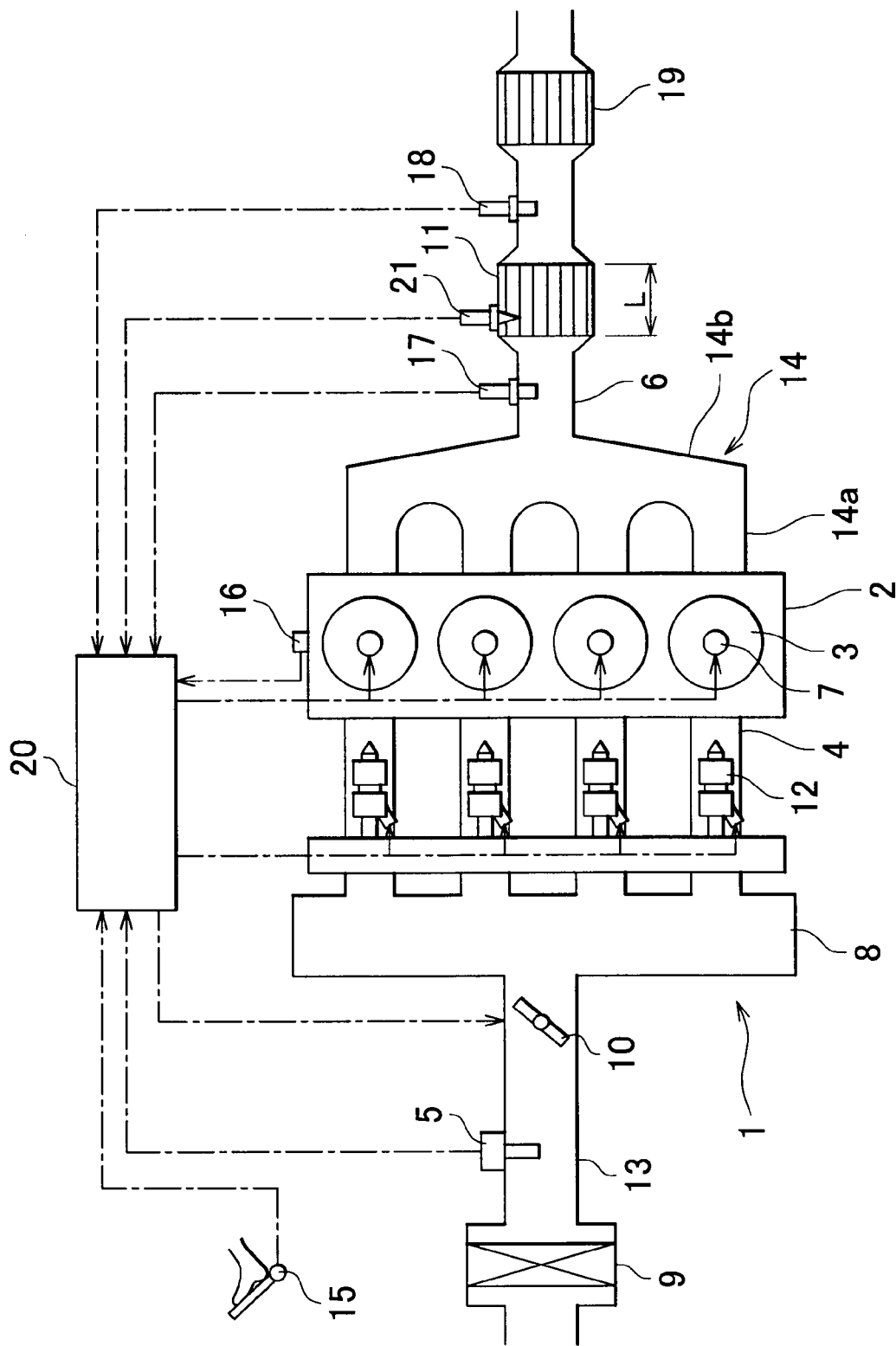
FIG. 1 is a view schematically showing an internal combustion engine according to an embodiment of the invention.

FIG. 1 is a view schematically showing an internal combustion engine according to an embodiment of the invention. As shown in FIG. 1, an internal combustion engine 1 burns air-fuel mixture in combustion chambers 3, which are within a cylinder block 2, to reciprocate pistons in cylinders, thereby producing power. The internal combustion engine 1 according to the embodiment of the invention is a multi-cylinder internal combustion engine for an automobile, more specifically, an in-line four cylinder spark ignition internal combustion engine, that is, a gasoline engine. However, an internal combustion engine to which the invention is applicable is not limited to the internal combustion engine described above. The invention is applicable to any type of multi-cylinder internal combustion engine regardless of the number of cylinders, combustion manner, etc.

Although not shown in FIG. 1, each cylinder is provided with an intake valve that opens and closes an intake port and an exhaust valve that opens and closes an exhaust port. The intake valve and the exhaust valve are arranged in a cylinder head of the internal combustion engine 1. The intake valves and the exhaust valves are opened or closed by camshafts. Spark plugs 7, which are used to ignite the air-fuel mixture in the combustion chambers 3, are fitted to the top portions of the cylinder head. Each cylinder is provided with the spark plug 7.

The intake ports of the respective cylinders are connected to a surge tank 8, which is an intake air gathering chamber, through branch pipes 4 that are communicated with the respective cylinders. An intake pipe 13 is connected to an upstream-side portion of the surge tank 8, and an air cleaner 9 is provided at an upstream-side end portion of the intake pipe 13. An airflow meter 5 that detects the intake air amount is fitted to the intake pipe 13. An electronically-controlled throttle valve 10 is arranged in the intake pipe 13 at a position downstream of the airflow meter 5. The intake ports, the branch pipes, the surge tank 8, and the intake pipe 13 constitute an intake passage.

The cylinders are provided with injectors 12 that inject fuel into the intake passage, more specifically, into the intake ports. The fuel injected from the injector 12 is mixed with the intake air to form the air-fuel mixture. The air-fuel mixture is taken into the combustion chamber 3 when the intake valve is open, compressed by the piston, ignited by the ignition plug 7, and then burned.

The exhaust ports of the respective cylinders are connected to an exhaust manifold 14. The exhaust manifold 14 is formed of branch pipes 14a, which are upstream-side portions of the exhaust manifold 14 and which are connected to the respective cylinders, and an exhaust gas gathering portion 14b, which is a downstream-side portion of the exhaust manifold 14. An exhaust pipe 6 is connected to a downstream-side portion of the exhaust gas gathering portion 14b. The exhaust ports, the exhaust manifold 14 and the exhaust pipe 6 constitute an exhaust passage. A catalyst 11 that is formed of a three-way catalyst is fitted to the exhaust pipe 6. A catalyst 19 that is also formed of a three-way catalyst is fitted to the exhaust pipe 6 at a position downstream of the catalyst 11.

The catalyst 11 and the catalyst 19 are arranged in tandem. A first air-fuel ratio sensor, that is, a catalyst upstream-side sensor 17, is arranged upstream of the catalyst 11. A second air-fuel ratio sensor, that is, a catalyst downstream-side sensor 18, is arranged downstream of the catalyst 11. The catalyst upstream-side sensor 17 is arranged in the exhaust passage at a position immediately upstream of the catalyst 11, and the catalyst downstream-side sensor 18 is arranged in the exhaust passage at a position immediately downstream of the catalyst 11. The catalyst upstream-side sensor 17 and the catalyst-downstream side sensor 18 detect the air-fuel ratio based on the oxygen concentration in the exhaust gas. As described above, the single catalyst upstream-side sensor 17 is arranged in the exhaust passage at the exhaust gas gathering portion.

The above-described spark plugs 7, the throttle valve 10, the injectors 12, etc. are electrically connected to an electronic control unit (hereinafter, referred to as "ECU") 20. The ECU 20 includes a CPU, a ROM, a RAM, an input port, an output port, a storage unit, etc. (all of which are not shown). As shown in FIG. 1, in addition to the airflow meter 5, the catalyst upstream-side sensor 17, and the catalyst downstream-side sensor 18, a crank angle sensor 16 that detects a crank angle of the internal combustion engine 1, an accelerator pedal operation amount sensor 15 that detects an accelerator pedal operation amount, a temperature sensor 21 that detects the temperature (bed temperature) of the upstream-side catalyst 11, and various other sensors are electrically connected to the ECU 20 via, for example, an A/D converter (not shown). The ECU 20 controls the spark plugs 7, the throttle valve 10, the injectors 12, etc., based on the values detected by various sensors to control the ignition timing, the fuel injection amount, the fuel injection timing, the throttle valve opening amount, etc., so that a desired power is output from the internal combustion engine. The throttle valve opening amount is usually controlled to an opening amount that corresponds to the accelerator pedal operation amount.

Figure 2:
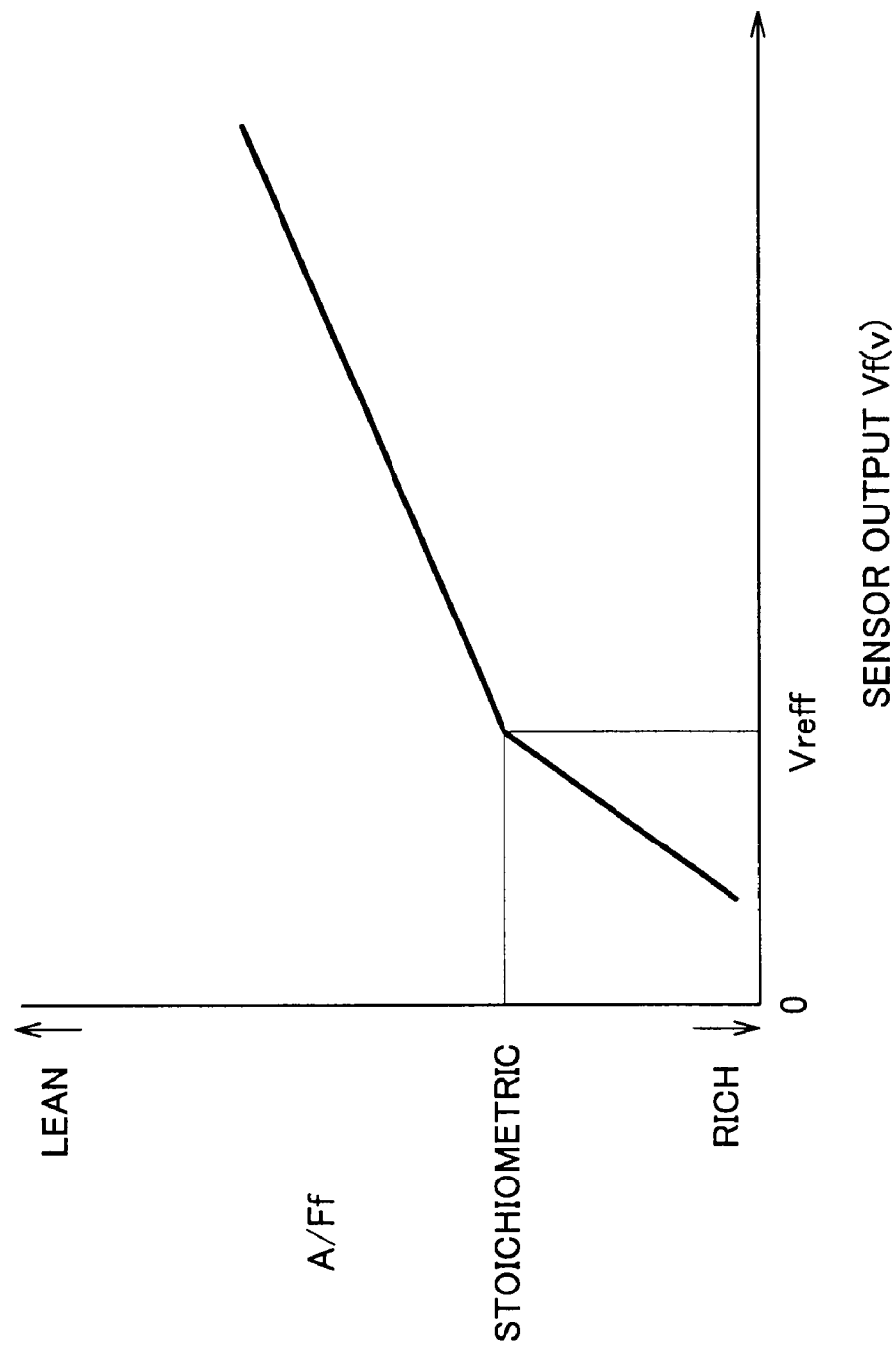
FIG. 2 is a graph indicating output characteristics of a catalyst upstream-side sensor according to the embodiment of the invention.

The catalyst upstream-side sensor 17 is formed of a so-called wide-range air-fuel ratio sensor, and is able to continuously detect the air-fuel ratio within a relatively wide air-fuel ratio range. FIG. 2 shows output characteristics of the catalyst upstream-side sensor 17. As shown in FIG. 2, the catalyst upstream-side sensor 17 outputs a voltage signal Vf of which the magnitude is proportional to the detected exhaust gas air-fuel ratio (catalyst upstream-side air-fuel ratio A/Ff). When the exhaust gas air-fuel ratio is the stoichiometric air-fuel ratio, an output voltage is Vreff (e.g. approximately 3.3V). The gradient of the line indicating the air-fuel ratio-voltage characteristic changes at the stoichiometric air-fuel ratio.

The catalyst downstream-side sensor 18 is formed of a so-called $O_2$ sensor, and the value output from the catalyst downstream-side sensor 18 abruptly changes at the stoichiometric air-fuel ratio. FIG. 3 shows output characteristics of the catalyst downstream-side sensor 18. As shown in FIG. 3, an output voltage Vr from the catalyst downstream-side sensor 18 transiently changes at the stoichiometric air-fuel ratio. When the exhaust gas air-fuel ratio (catalyst downstream-side air-fuel ratio A/Fr) is leaner than the stoichiometric air-fuel ratio, the output voltage Vr exhibits a low voltage of, for example, approximately 0.1V. On the other hand, when the exhaust gas air-fuel ratio is richer than the stoichiometric air-fuel ratio, the output voltage Vr exhibits a high voltage of, for example, approximately 0.9V. An output voltage substantially intermediate between these output voltages, that is, a voltage Vrefr of 0.45V is used as a voltage value that corresponds to the stoichiometric air-fuel ratio. When the output voltage Vr from the catalyst downstream-side sensor 18 is higher than the voltage Vrefr, it is determined that the exhaust gas air-fuel ratio is richer than the stoichiometric air-fuel ratio. On the other hand, when the output voltage Vr from the catalyst downstream-side sensor 18 is lower than the voltage Vrefr, it is determined that the exhaust gas air-fuel ratio is leaner than the stoichiometric air-fuel ratio. In this way, the exhaust gas air-fuel ratio is detected.

The upstream-side catalyst 11 and the downstream-side catalyst 19 each remove NOx, HC and CO, which are toxic substances in the exhaust gas, at the same time, when an air-fuel ratio A/F in the exhaust gas that flows into the catalyst is at or around the stoichiometric air-fuel ratio (e.g. A/F=14.6). The air-fuel ratio range, in which NOx, HC and CO are removed at the same time with high efficiency, is relatively narrow.

The ECU 20 executes air-fuel ratio control so that the air-fuel ratio of the exhaust gas that flows into the upstream-side catalyst 11 is controlled to a value at or around the stoichiometric air-fuel ratio. The air-fuel ratio control includes main air-fuel ratio control (main air-fuel ratio feedback control) and sub-air-fuel ratio control (sub-air-fuel ratio feedback control). The main air-fuel ratio control is executed in such a manner that the exhaust gas air-fuel ratio that is detected by the catalyst upstream-side sensor 17 agrees with a predetermined target air-fuel ratio, that is, the stoichiometric air-fuel ratio. The sub-air-fuel ratio control is executed in such a manner that the exhaust gas air-fuel ratio that is detected by the catalyst downstream-side sensor 18 agrees with the stoichiometric air-fuel ratio.

A temperature detection portion (element portion) of the temperature sensor 21 is fitted in the upstream-side catalyst 11, whereby the temperature sensor 21 directly detects the bed temperature of the upstream-side catalyst 11. The position of the temperature detection portion within the upstream-side catalyst 11 is basically not particularly limited. However, in the embodiment of the invention, the temperature detection portion is arranged at a position upstream of an intermediate position L/2 in the upstream-side catalyst 11, which is defined by dividing a passage length L of the upstream catalyst 11 by two. The reason why the temperature detection portion is arranged at this position will be described below.

A malfunctions occurs in only part of all the cylinders and air-fuel ratio variation among the cylinders (hereinafter, referred to as "imbalance" where appropriate) occurs in some cases. These cases includes the case where the amount of fuel injected into the cylinder #1 is larger than the amount of fuel injected into each of the other cylinders #2, #3 and #4 and the air-fuel ratio in the cylinder #1 is considerably richer than the air-fuel ratio in each of the cylinders #2, #3 and #4. Even in this case, if a relatively large correction amount is used in the main air-fuel ratio feedback control described above, the air-fuel ratio of the total gas that is supplied to the catalyst upstream-side sensor 17 may be controlled to the stoichiometric air-fuel ratio. However, if the air-fuel ratio in each cylinder is checked, the air-fuel ratio in the cylinder #1 is richer than the stoichiometric air-fuel ratio by a large amount, whereas the air-fuel ratio in each of the cylinders #2, #3 and #4 is leaner than the stoichiometric air-fuel ratio. That is, the air-fuel ratio of the exhaust gas that is supplied to the catalyst upstream-side sensor 17 agrees with the stoichiometric air-fuel ratio in total. This situation is not appropriate for proper exhaust emission control. Therefore, the embodiment of the invention provides an apparatus that detects abnormal air-fuel ratio variation among the cylinders.

Figure 4A:
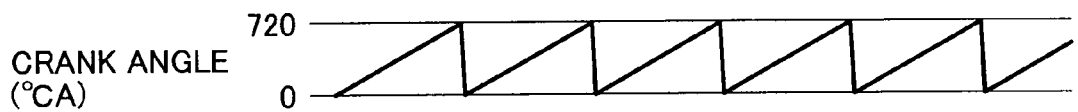
FIGS. 4A and 4B show fluctuations in an exhaust gas air-fuel ratio based on respective ranges of air-fuel ratio variation among cylinders according to the embodiment of the invention.
Figure 4B:
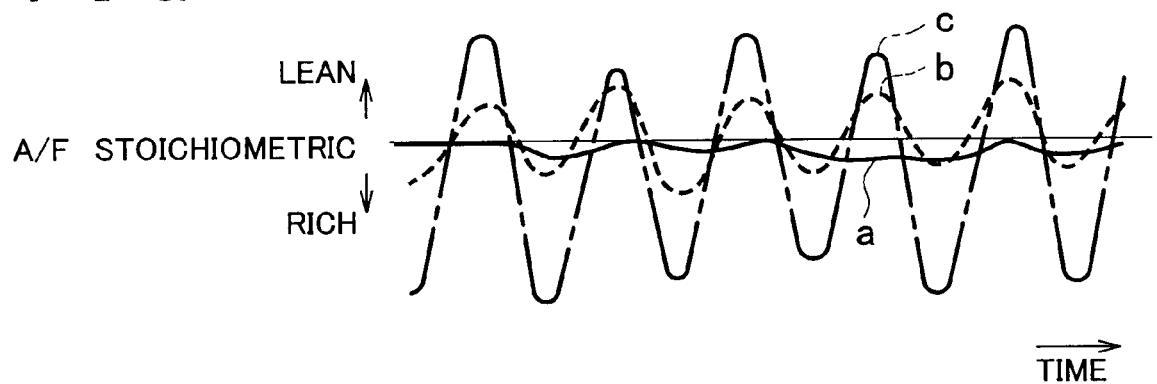

As shown in FIGS. 4A and 4B, if air-fuel ratio variation among the cylinders occurs, the fluctuation range of the exhaust gas air-fuel ratio within one engine cycle (=720° C.A)

becomes wider. The air-fuel ratio graph "a" in FIG. 4B indicates the detected catalyst upstream-side air-fuel ratio A/Ff when there is no air-fuel ratio variation among the cylinders. The air-fuel ratio graph "b" in FIG. 4B indicates the detected catalyst upstream-side air-fuel ratio A/Ff when the air-fuel ratio in only one cylinder is richer than the stoichiometric air-fuel ratio by 20% (an imbalance ratio is 20%). The air-fuel ratio graph "c" in FIG. 4B indicates the detected catalyst upstream-side air-fuel ratio A/Ff when the air-fuel ratio in only one cylinder is richer than the stoichiometric air-fuel ratio by 50% (an imbalance ratio is 50%). As shown in FIG. 4B, as the range of variation increases, the amplitude of air-fuel ratio fluctuation with respect to the stoichiometric air-fuel ratio increases.

An imbalance ratio (%) is a parameter that is related to the range of air-fuel ratio variation among the cylinders. In some cases, the amount of fuel injected into one of all the cylinders deviates from a reference fuel injection amount. The imbalance ratio is a value that indicates a deviation of the amount of fuel injected into the one cylinder (imbalance cylinder) from the reference fuel injection amount, that is, the amount of fuel that is injected into each of the other cylinders (balance cylinders). If the imbalance ratio is denoted by IB, the amount of fuel injected into the imbalance cylinder is denoted by Qib, and the amount of fuel injected into each of the balance cylinders (i.e., reference fuel injection amount) is denoted by Qs, the imbalance ratio IB is expressed by the following equation IB=(Qib−Qs)/Qs. A higher imbalance ratio IB indicates that the deviation of the amount of fuel injected into the imbalance cylinder from the amount of fuel injected into each balance cylinder (i.e., reference fuel injection amount) is larger and the range of air-fuel ratio variation is wider.

The following fact is newly revealed. If air-fuel ratio variation among the cylinders occurs and the exhaust gas air-fuel ratio fluctuation within one engine cycle as shown in FIGS. 4A and 4B occurs, an oxidation-reduction reaction repeatedly occurs in the upstream-side catalyst 11 at short time intervals, which promotes activation of the upstream-side catalyst 11. As a result, the temperature of the upstream-side catalyst 11 becomes higher than that when there is no air-fuel ratio variation among the cylinders. The upstream-side catalyst 11 (as well as the downstream-side catalyst 19) has oxygen storage function ($O_2$ storage function). When the air-fuel ratio of the exhaust gas supplied to the upstream-side catalyst 11 is leaner than the stoichiometric air-fuel ratio, the upstream-side catalyst 11 stores excess oxygen in the exhaust gas. On the other hand, when the air-fuel ratio of the exhaust gas supplied to the upstream-side catalyst 11 is richer than the stoichiometric air-fuel ratio, the upstream-side catalyst 11 releases the stored oxygen. Storage of the oxygen in this case corresponds to an oxidation reaction, and release of the oxygen in this case corresponds to a reduction reaction. As shown in FIGS. 4A and 4B, if air-fuel ratio variation among the cylinders occurs, the air-fuel ratio of the exhaust gas that is supplied to the upstream-side catalyst 11 changes between a lean air-fuel ratio and a rich air-fuel ratio within one engine cycle. Therefore, an oxidation reaction occurs each time the air-fuel ratio of the exhaust gas is changed to a lean air-fuel ratio, and a reduction reaction occurs each time the air-fuel ratio of the exhaust gas is changed to a rich air-fuel ratio. As a result, the temperature of the upstream-side catalyst 11 increases.

Figure 5:
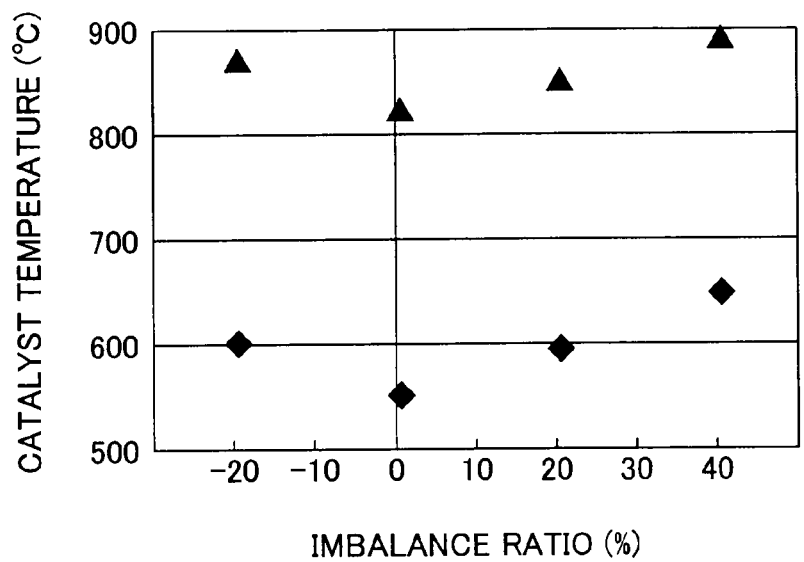
FIG. 5 is a graph showing the relationship between an imbalance ratio and a catalyst temperature according to the embodiment of the invention.

FIG. 5 shows the relationship between the imbalance ratio (%) and the catalyst temperature (° C.). The data indicated by triangles in FIG. 5 is obtained when a vehicle that includes the internal combustion engine 1 travels at a constant speed of 120 km/h, and the data indicated by rhombuses in FIG. 5 is obtained when the vehicle that includes the internal combustion engine 1 travels at a constant speed of 60 km/h. As shown in FIG. 5, as the deviation of the imbalance ratio (%) from 0% increases, that is, as the range of air-fuel ratio variation becomes wider, the catalyst temperature increases.

Therefore, according to the embodiment of the invention, based on the correlation between the range of the air-fuel ratio variation among the cylinders (imbalance ratio) and the catalyst temperature, whether abnormal air-fuel ratio variation among the cylinders has occurred is determined in the following manner. The actual temperature of the upstream-side catalyst 11 is detected by the temperature sensor 21, while the temperature of the upstream-side catalyst 11 is estimated based on the engine operating state. Then, whether abnormal air-fuel ratio variation among the cylinders has occurred is determined based on the detected catalyst temperature and the estimated catalyst temperature. The estimated catalyst temperature is independent of the range of air-fuel ratio variation among the cylinders. In contrast, the catalyst temperature that is detected by the temperature sensor 21 reflects the range of air-fuel ratio variation among the cylinders. If abnormal air-fuel ratio variation among the cylinders occurs, the detected catalyst temperature deviates from the estimated catalyst temperature by a large amount. Therefore, it is possible to determine whether abnormal air-fuel ratio variation has occurred among the cylinders by monitoring the deviation of the detected catalyst temperature from the estimated catalyst temperature.

Figure 6:
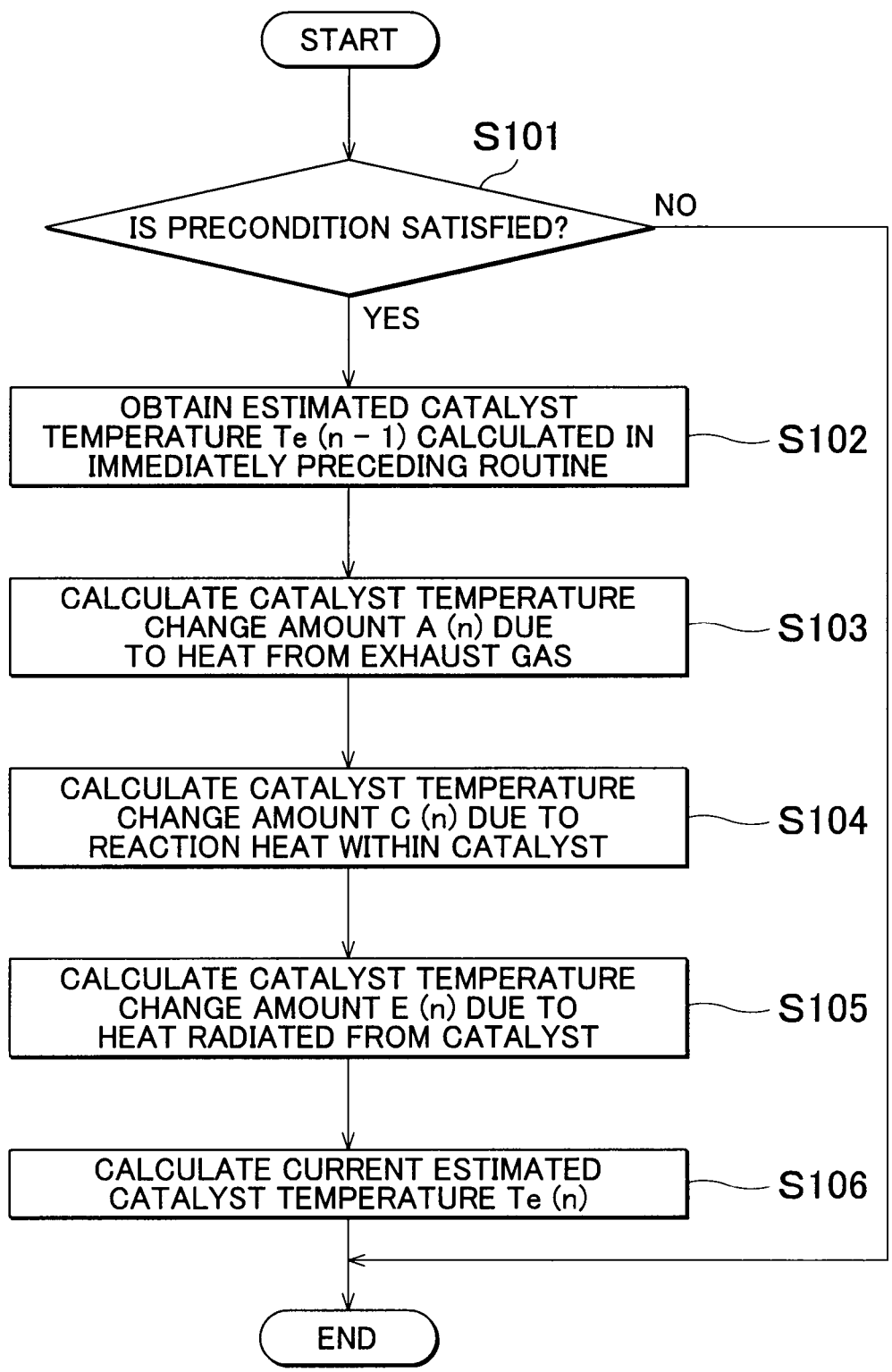
FIG. 6 is a flowchart showing a catalyst temperature estimation routine according to the embodiment of the invention.

FIG. 6 shows a routine for estimating the temperature of the upstream-side catalyst 11. The ECU 20 executes the routine periodically at predetermined calculation cycles.

First, the ECU 20 determines in step (hereinafter, referred to as "S") 101 whether a precondition suitable for execution of catalyst temperature estimation is satisfied. For example, if the engine has been started and the coolant temperature detected by a coolant temperature sensor (not shown) is higher than a predetermined temperature (e.g. −40° C.), it is determined that the precondition is satisfied. Note that, the precondition is not limited to this. If it is determined that the precondition is not satisfied, the routine ends. On the other hand, if it is determined that the precondition is satisfied, S102 is executed.

In S102, the ECU 20 obtains an estimated catalyst temperature that is calculated in the immediately preceding routine (n−1), that is, an estimated catalyst temperature Te (n−1).

Next, in S103, the ECU 20 calculates a catalyst temperature change amount A (n) in the current routine (n), which is an amount of change in the catalyst temperature caused by heat transferred from the exhaust gas. The catalyst temperature change amount A (n) is obtained by Equation 1 indicated below.

$$A(n)=A(n-1)+\{K1\times(B-Te(n-1))-A(n-1)\}/K2 \quad \text{Equation 1}$$

K1 is a predetermined value that may be determined on an as-required basis. K2 is a predetermined smoothing rate, and is set in advance to a value that is larger than 1. B is a parameter (air amount parameter) that changes in accordance with an intake air amount Ga, and is determined based on the intake air amount Ga detected by the airflow meter 5 according to a prescribed map (or a functional equation). As the intake air amount Ga increases, the air amount parameter B also increases. The air amount parameter B is a main parameter that indicates the engine operating state. In S103, a value within the brackets in the second term, that is, a current temperature change which is calculated based on the air amount parameter B, is smoothed by the smoothing rate K2, and a value derived through the smoothing calculation is added to a catalyst temperature change amount A (n−1), that is, a catalyst temperature change amount calculated in the immediately preceding routine (n−1), whereby the current catalyst temperature change amount A (n) is obtained. Even if the engine operating state changes, the influence of such a change is reflected in the catalyst temperature after a time lag. Therefore, the smoothing calculation described above is executed.

Next, in S104, the ECU 20 calculates a catalyst temperature change amount C (n) in the current routine (n), which is an amount of change in the catalyst temperature caused by reaction heat within the catalyst. The catalyst temperature change amount C (n) is obtained by Equation 2 indicated below.

$$C(n)=C(n-1)+(K3 \times D-C(n-1))/K4 \qquad \text{Equation 2}$$

K3 is a predetermined value that may be determined on an as-required basis. K4 is a predetermined smoothing rate, and is set in advance to a value that is larger than 1. D is a parameter (estimated temperature parameter) that changes in accordance with an estimated catalyst temperature Te, and is determined based on the estimated catalyst temperature Te (n−1), which is calculated in the immediately preceding routine and which is obtained in S102 in the current routine, according to a prescribed map (or a functional equation). As the estimated catalyst temperature Te increases, the estimated temperature parameter D also increases. As in S103, a value within the brackets in the second term, that is, a current temperature change which is calculated based on the estimated temperature parameter D, is smoothed by the smoothing rate K4, and a value derived through the smoothing calculation is added to a catalyst temperature change amount C (n−1), that is, a catalyst temperature change amount calculated in the immediately preceding routine, whereby the current catalyst temperature change amount C (n) is obtained.

Next, in S105, the ECU 20 calculates a catalyst temperature change amount E (n) in the current routine (n), which is an amount of change in the catalyst temperature caused by heat radiated from the catalyst. The catalyst temperature change amount E (n) is obtained by Equation 3 indicated below.

$$E(n)=K5 \times \{Te(n-1)-Ta\} \times F \qquad \text{Equation 3}$$

K5 is a predetermined value that may be defined on an as-required basis. Ta indicates an outside air temperature, and is detected by an outside air temperature sensor (not shown). F is a parameter (vehicle speed parameter) that changes in accordance with a vehicle speed Vh, which is a speed of the vehicle that includes the engine 1, and is determined based on the vehicle speed Vh detected by a vehicle speed sensor (not shown), according to a prescribed map (or a functional equation). As the vehicle speed Vh increases, the vehicle speed parameter F also increases. As the outside air temperature Ta decreases, or as the vehicle speed Vh increases, the catalyst temperature change amount E (n) increases.

Next, in S106, the ECU 20 calculates an estimated catalyst temperature Te (n) in the current routine (n). The estimated catalyst temperature Te (n) is obtained by Equation 4 indicated below. After completion of S106, the current routine ends.

$$Te(n)=Te(n-1)+\{A(n)+C(n)-E(n)\} \qquad \text{Equation 4}$$

As is understood from the above-described method for calculating the estimated catalyst temperature Te (n), the estimated catalyst temperature Te is a value independent of the range of air-fuel ratio variation among the cylinders. Therefore, even if abnormal air-fuel ratio variation among the cylinders has occurred, the estimated catalyst temperature Te exhibits the same value that is obtained when abnormal air-fuel ratio variation among the cylinders has not occurred. Accordingly, it is possible to determine whether abnormal air-fuel ratio variation among the cylinders has occurred by detecting a deviation of the catalyst temperature (detected catalyst temperature Ts) detected by the temperature sensor 21 from the estimated catalyst temperature Te.

Especially, in the upstream-side catalyst 11, the upstream-side end first contacts the exhaust gas. Therefore, the temperature change gradually proceeds from the upstream-side end toward the downstream-side end of the upstream-side catalyst 11. Accordingly, in order to detect a temperature change in the upstream-side catalyst 11 immediately, the temperature detection portion is arranged preferably at a position upstream of the intermediate position L/2 in the upstream-side catalyst 11, which is defined by dividing the passage length L of the upstream catalyst 11 by two. More preferably, the temperature detection portion is arranged at a position as close as possible to the upstream-side end.

Figure 7:
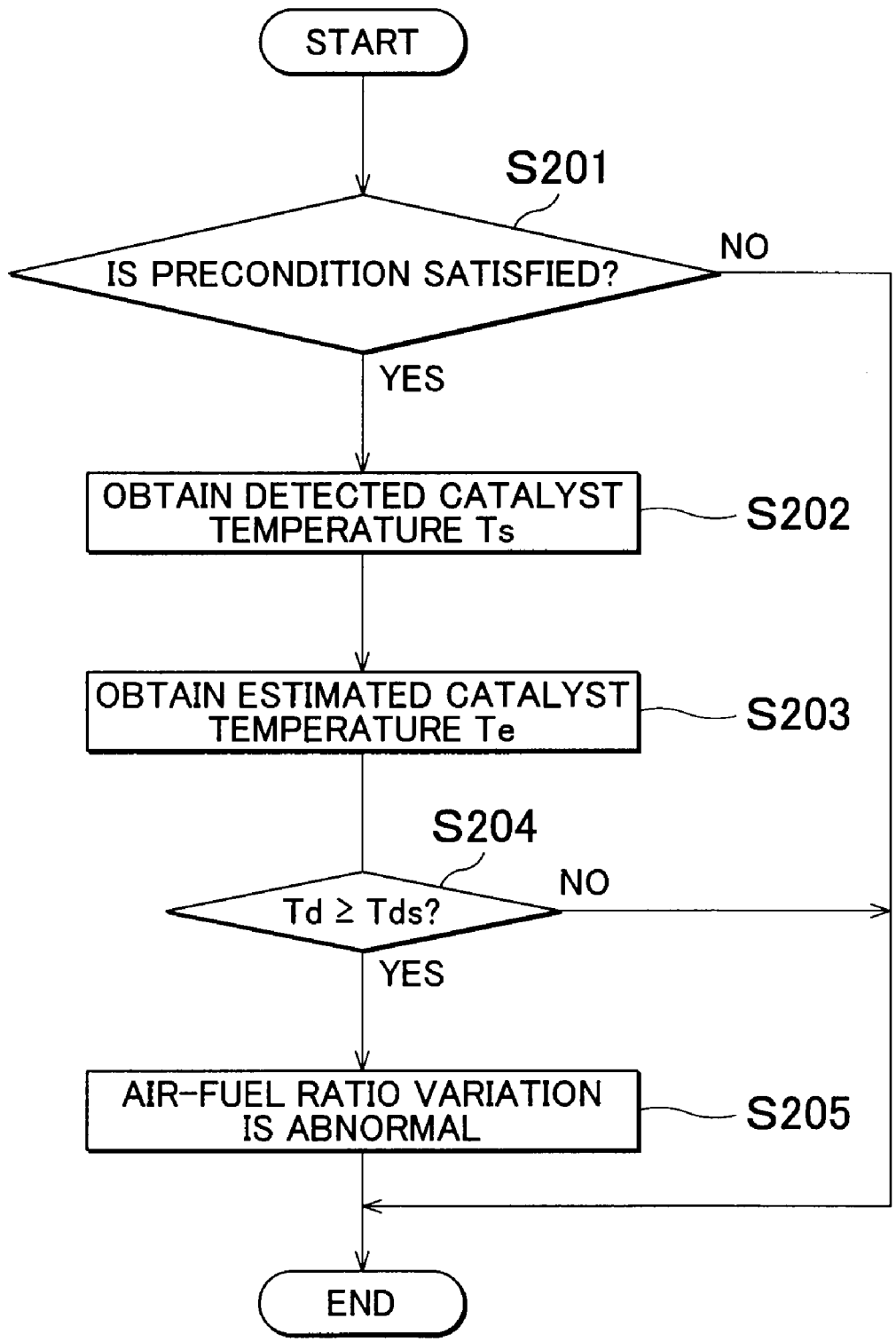
FIG. 7 is a flowchart showing a first routine for determining whether abnormal air-fuel ratio variation among the cylinders has occurred according to the embodiment of the invention.

Next, a first routine for determining whether abnormal air-fuel ratio variation among the cylinders has occurred will be described with reference to FIG. 7. The ECU 20 executes the routine periodically at predetermined calculation cycles.

In S201, the ECU 20 determines whether a predetermined precondition suitable for determining as to whether abnormal air-fuel ratio variation has occurred is satisfied. It is determined that the precondition is satisfied, for example, when warming-up of the engine is completed, the catalyst upstream-side sensor 17 and the catalyst downstream-side sensor 18 are activated, and the upstream-side catalyst 11 and the downstream-side catalyst 19 are activated. It is determined that warming-up of the engine is completed, for example, when the detected coolant temperature is equal to or higher than a predetermined value (e.g. 75° C.). It is determined that the catalyst upstream-side sensor 17 and the catalyst downstream-side sensor 18 are activated when impedances of these sensors that are detected by the ECU 20 are values corresponding to predetermined activation temperatures. It is determined that the upstream-side catalyst 11 and the downstream-side catalyst 19 are activated when the estimated catalyst temperatures of these catalysts reach predetermined activation temperatures. The estimated catalyst temperature of the upstream-side catalyst 11 is calculated according to the routine in FIG. 6, and the estimated catalyst temperature of the downstream-side catalyst 19 is calculated according to another routine (not shown).

If it is determined that the precondition is not satisfied, the routine ends without executing the following steps. On the other hand, if it is determined that the precondition is satisfied, the ECU 20 obtains in S202 the temperature of the upstream-side catalyst 11 detected by the temperature sensor 21, that is, the detected catalyst temperature Ts.

Next, in S203, the ECU 20 obtains the temperature of the upstream-side catalyst 11 that is estimated according to the catalyst temperature estimation routine in FIG. 6, that is, the estimated catalyst temperature Te.

Next, in S204, the ECU 20 calculates an absolute value of a deviation Td of the detected catalyst temperature Ts from the estimated catalyst temperature Te (Td=|Ts−Te|). Then the ECU 20 compares the absolute value of the deviation Td with a predetermined abnormality reference value Tds. The abnormality reference value Tds is set in advance to a value that is equal to the absolute value of the deviation of the detected catalyst temperature Ts from the estimated catalyst temperature Te, which is obtained when air-fuel ratio variation among the cylinders is unacceptably large (or when the imbalance ratio deviates from 0% by an unacceptably large amount) due to a malfunction in a fuel system (e.g. injector 12) of part of the cylinders.

If the deviation Td is smaller than the abnormality reference value Tds, it is determined that abnormal air-fuel ratio variation among the cylinders has not occurred, and the routine ends.

On the other hand, if it is determined that the deviation Td is equal to or larger than the abnormality reference value Tds, it is determined in S205 that abnormal air-fuel ratio variation among the cylinders has occurred, and the routine ends. Preferably, the ECU 20 activates an alarm device, for example, a check lamp to notify a user of occurrence of the abnormality upon making a determination that abnormal air-fuel ratio variation has occurred.

Figure 8:
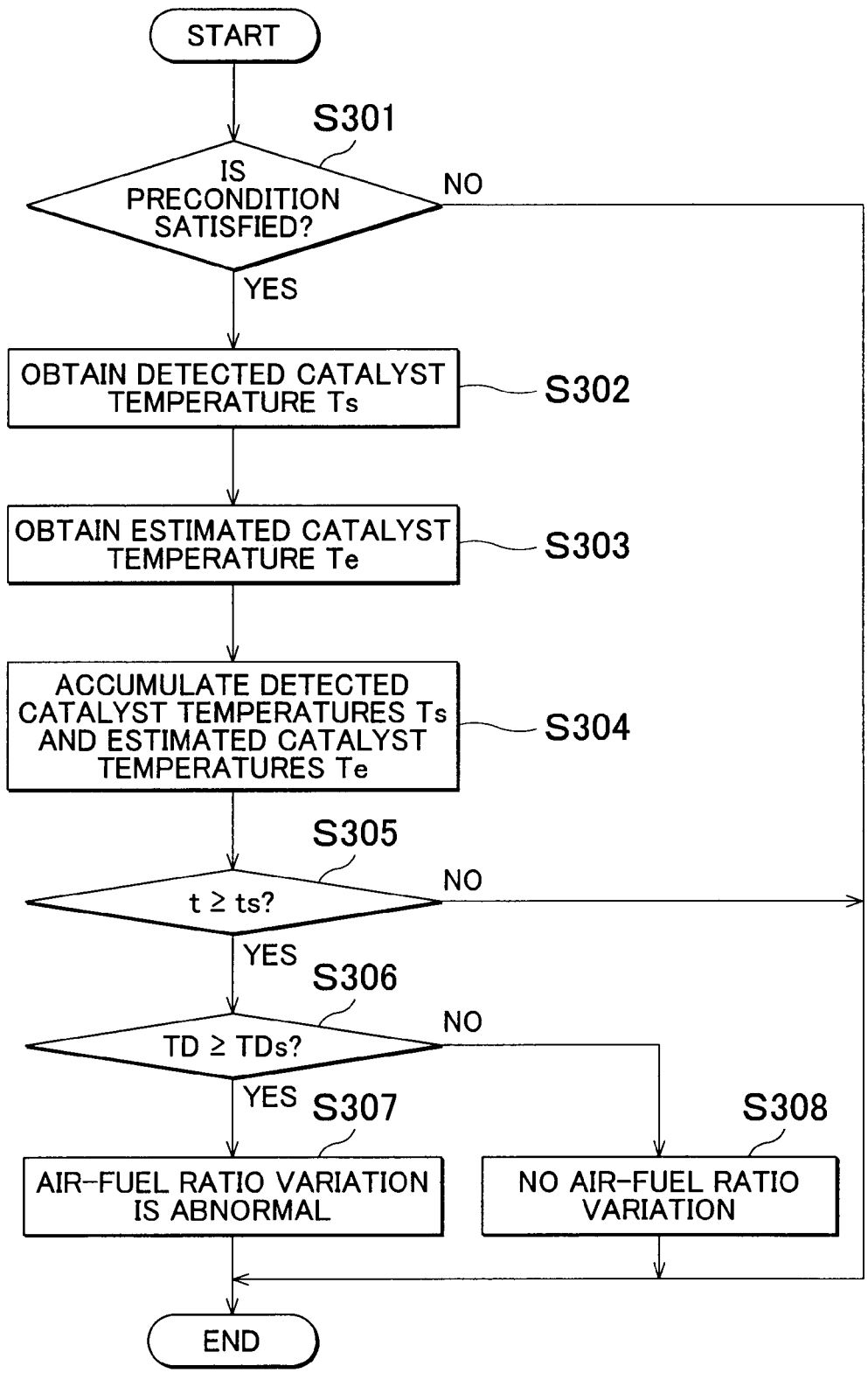
FIG. 8 is a flowchart showing a second routine for determining whether abnormal air-fuel ratio variation among the cylinders has occurred according to the embodiment of the invention.

Next, a second routine for determining whether abnormal air-fuel ratio variation among the cylinders has occurred will be described with reference to FIG. 8. The ECU 20 executes the routine periodically at predetermined calculation cycles.

S301 to S303 are the same as S201 to S203, respectively. In S304 that is subsequent to S303, accumulation is executed using the detected catalyst temperature Ts that is obtained in S302 in the current routine, and accumulation is executed using the estimated catalyst temperature Te that is obtained in S303 in the current routine, individually. Each time the routine is executed after the precondition is satisfied, accumulation of the detected catalyst temperatures Ts and accumulation of the estimated catalyst temperatures Te are executed individually. In the current routine, the detected catalyst temperature Ts obtained in S302 in the current routine is added to the accumulated value that is obtained by accumulating the detected catalyst temperatures Ts that are obtained in the preceding routines including the immediately perceiving routine. Similarly, in the current routine, the estimated catalyst temperature Te obtained in S303 in the current routine is added to the accumulated value that is obtained by accumulating the estimated catalyst temperatures Te that are obtained in the preceding routines including the immediately perceiving routine. In this way, a current accumulated value $\Sigma Ts$ of the detected catalyst temperatures Ts and a current accumulated value $\Sigma Te$ of the estimated catalyst temperatures Te are obtained.

Next, in S305, the ECU 20 determines whether a time that has elapsed after the precondition is satisfied, that is, a time t that has elapsed after accumulation is started (accumulated time t), has exceeded a predetermined time ts.

If it is determined that the accumulated time t is shorter than the predetermined time ts, the routine ends. On the other hand, if it is determined that the accumulated time t is equal to or longer than the predetermined time ts, the ECU 20 calculates an absolute value of a deviation TD of the final accumulated value $\Sigma Ts$ of the detected catalyst temperatures from the final accumulated value $\Sigma Te$ of the estimated catalyst temperatures Te (TD=|$\Sigma Ts-\Sigma Te$|), and compares the absolute value of the deviation TD with a predetermined abnormality reference value TDs. The abnormality reference value TDs is set in advance to a value that is equal to the absolute value of the deviation of the accumulated value $\Sigma Ts$ of the detected catalyst temperatures from the accumulated value $\Sigma Te$ of the estimated catalyst temperatures Te, which is obtained when air-fuel ratio variation among the cylinders is unacceptably large (or when the imbalance ratio deviates from 0% by an unacceptably large amount) due to a malfunction in a fuel system (e.g. injector 12) of part of the cylinders.

If it is determined that the absolute value of the deviation TD is smaller than the abnormality reference value TDs, it is determined in S308 that there is no air-fuel ratio variation among the cylinders, that is, no malfunction has occurred. Then, the routine ends.

On the other hand, if it is determined that the absolute value of the deviation TD is equal to or larger than the abnormality reference value TDs, it is determined in S307 that abnormal air-fuel ratio variation among the cylinders has occurred. Then, the routine ends. Preferably, the ECU 20 activates an alarm device, for example, a check lamp to notify a user of occurrence of the abnormality upon making a determination that abnormal air-fuel ratio variation has occurred.

In the second routine, the ECU 20 uses the accumulated value ETs obtained by accumulating the detected catalyst temperatures for the predetermined time and the accumulated value $\Sigma Te$ obtained by accumulating the estimated catalyst temperatures Te for the predetermined time. Therefore, detection error may be reduced when the second routine is used than when the first routine in which the detected catalyst temperature Ts and the estimated catalyst temperature Te, which are momentary values, are used. In the second routine, the final accumulated value $\Sigma Ts$ of the detected catalyst temperatures and the final accumulated value $\Sigma Te$ of the estimated catalyst temperatures are individually obtained, and then the absolute value of the deviation TD of the accumulated value $\Sigma Ts$ from the accumulated value $\Sigma Te$ is obtained. Alternatively, the absolute values of the deviations Td from the detected catalyst temperatures from the estimated catalyst temperatures (Td=|Ts−Te|) may be accumulated successively to obtain a final accumulated value. This method is substantially the same as the method in the second routine.

According to the embodiment of the invention described above, it is possible to efficiently determine whether air-fuel ratio variation among the cylinders has occurred using the feature that the catalyst temperature increases if abnormal air-fuel ratio variation among the cylinders has occurred. Also, detecting such abnormal air-fuel ratio variation among the cylinders makes it possible to prevent an excessive increase in the catalyst temperature due to abnormal air-fuel ratio variation and occurrence of a malfunction in the catalyst.

While the example embodiment of the invention has been described, it is to be understood that the invention is not limited to the example embodiment. To the contrary, the invention is intended to cover various modifications and equivalent arrangements. For example, the internal combustion engine described above is an internal combustion engine of an inlet port (intake passage) injection type. Alternatively, the invention may be applied to a direct-injection engine or a dual injection engine in which either intake port injection or direct injection may be performed. The number of temperature sensors that detect the catalyst temperature is not limited to one. The catalyst temperature may be estimated using parameters other than the intake air amount, the outside temperature and the vehicle speed.

While the invention has been described with reference to an example embodiment thereof, it is to be understood that the invention is not limited to the example embodiment or constructions. To the contrary, the invention is intended to cover various modifications and equivalent arrangements. In addition, while the various elements of the example embodiment are shown in various combinations and configurations, which are example, other combinations and configurations, including more, less or only a single element, are also within the scope of the invention.

What is claimed is:

1. An apparatus for detecting abnormal air-fuel ratio variation among cylinders of a multi-cylinder internal combustion engine, comprising:

a catalyst that is provided in an exhaust passage of the multi-cylinder internal combustion engine;

a catalyst temperature detection unit that detects a temperature of the catalyst;

a catalyst temperature estimation unit that estimates a temperature of the catalyst based on an engine operating state; and an abnormality detection unit that determines whether abnormal air-fuel ratio variation among the cylinders has occurred based on the detected temperature of the catalyst and the estimated temperature of the catalyst.

2. The apparatus according to claim 1, wherein the abnormality detection unit determines whether abnormal air-fuel ratio variation among the cylinders has occurred based on a deviation of the detected temperature of the catalyst from the estimated temperature of the catalyst.

3. The apparatus according to claim 1, wherein the abnormality detection unit determines whether abnormal air-fuel ratio variation among the cylinders has occurred based on a deviation of an accumulated value obtained by accumulating the detected temperatures of the catalyst for a predetermined time from an accumulated value obtained by accumulating the estimated temperatures of the catalyst for the predetermined time.

4. The apparatus according to claim 1, wherein the abnormality detection unit determines whether abnormal air-fuel ratio variation among the cylinders has occurred based on an accumulated value that is obtained by accumulating deviations of the detected temperatures of the catalyst from the estimated temperatures of the catalyst for a predetermined time.

5. The apparatus according to claim 1, further comprising:
an intake air amount detection unit that detects an amount of air taken in the internal combustion engine, wherein the catalyst temperature estimation unit estimates a temperature of the catalyst based on at least the amount of air taken in the internal combustion engine, which is detected by the intake air amount detection unit.

6. The apparatus according to claim 5, wherein the catalyst temperature estimation unit estimates a temperature of the catalyst based on an amount of change in the temperature of the catalyst caused by heat transferred from exhaust gas discharged from the internal combustion engine, an amount of change in the temperature of the catalyst caused by reaction heat within the catalyst, and an amount of change in the temperature of the catalyst caused by heat radiated from the catalyst.

7. A method for detecting abnormal air-fuel ratio variation among cylinders of a multi-cylinder internal combustion engine that includes a catalyst that is provided in an exhaust passage of the multi-cylinder internal combustion engine and a catalyst temperature detection unit that detects a temperature of the catalyst, comprising:

estimating a temperature of the catalyst based on an engine operating state; and determining whether abnormal air-fuel ratio variation among the cylinders has occurred based on the detected temperature of the catalyst and the estimated temperature of the catalyst.

8. The method according to claim 7, wherein whether abnormal air-fuel ratio variation among the cylinders has occurred is determined based on a deviation of the detected temperature of the catalyst from the estimated temperature of the catalyst.

9. The method according to claim 7, wherein whether abnormal air-fuel ratio variation among the cylinders has occurred is determined based on a deviation of an accumulated value obtained by accumulating the detected temperatures of the catalyst for a predetermined time from an accumulated value obtained by accumulating the estimated temperatures of the catalyst for the predetermined time.

10. The method according to claim 7, wherein whether abnormal air-fuel ratio variation among the cylinders has occurred is determined based on an accumulated value that is obtained by accumulating deviations of the detected temperatures of the catalyst from the estimated temperatures of the catalyst for a predetermined time.

11. The method according to claim 7, wherein the internal combustion engine includes an intake air amount detection unit that detects an amount of air taken in the internal combustion engine,
the method further comprising:
detecting an amount of air taken in the internal combustion engine; and
estimating a temperature of the catalyst based on at least the detected amount of air taken in the internal combustion engine.

12. The method according to claim 11, wherein a temperature of the catalyst is estimated based on an amount of change in the temperature of the catalyst caused by heat transferred from exhaust gas discharged from the internal combustion engine, an amount of change in the temperature of the catalyst caused by reaction heat within the catalyst, and an amount of change in the temperature of the catalyst caused by heat radiated from the catalyst.

13. The apparatus according to claim 1, wherein the catalyst receives exhaust from a plurality of the cylinders of the multi-cylinder internal combustion engine.

14. The method according to claim 7, wherein the catalyst receives exhaust from a plurality of the cylinders of the multi-cylinder internal combustion engine.

* * * * *